Dec. 29, 1959     K. R. LUNG     2,919,357
ELECTRIC MOTOR CONSTRUCTION
Filed July 18, 1957     3 Sheets-Sheet 1
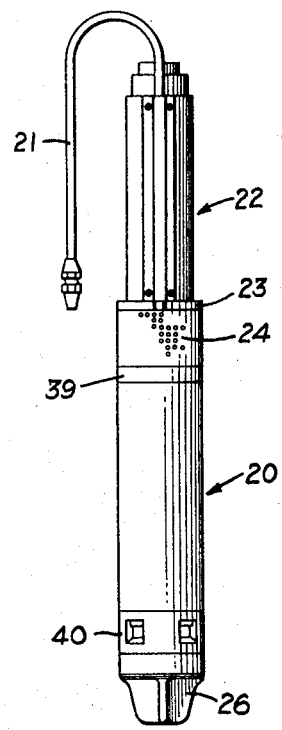
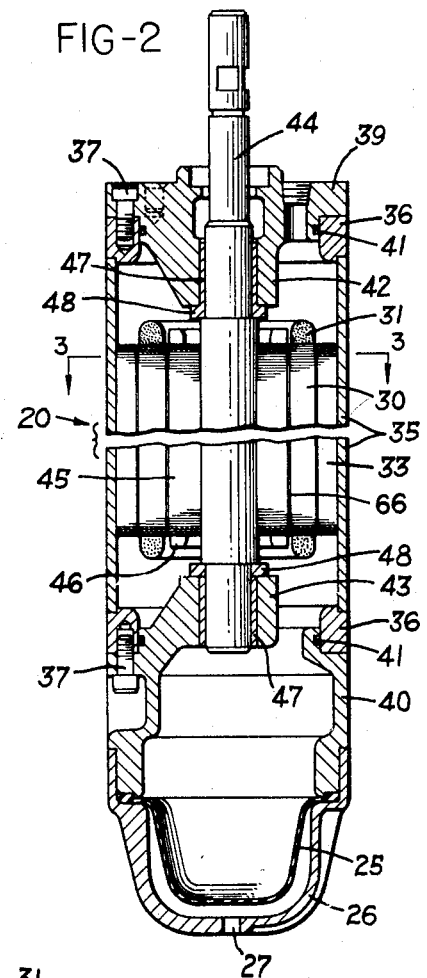
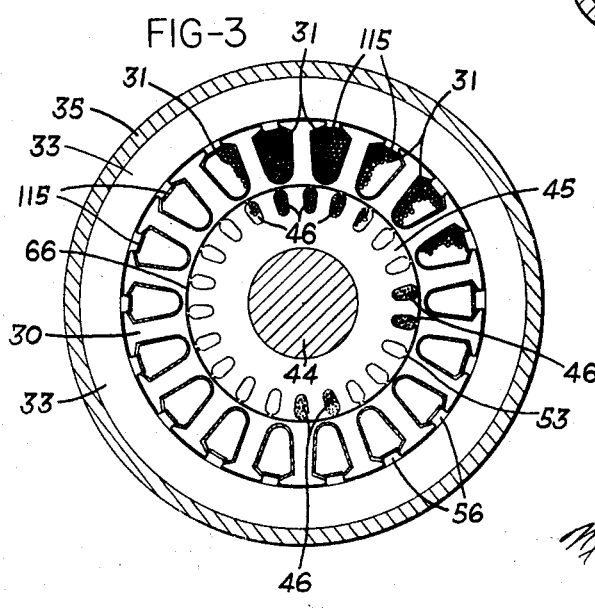
INVENTOR.
KENNETH R. LUNG
BY
*Marechal, Biebel, French & Bugg*
ATTORNEYS Dec. 29, 1959     K. R. LUNG     2,919,357
ELECTRIC MOTOR CONSTRUCTION
Filed July 18, 1957     3 Sheets-Sheet 2
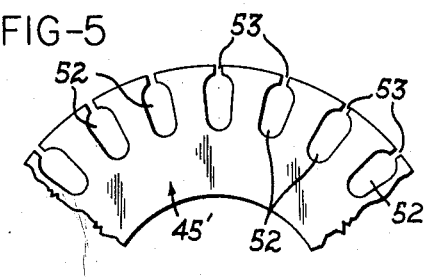
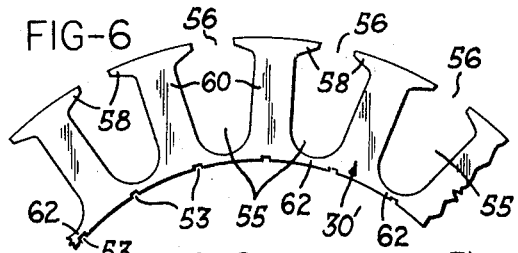
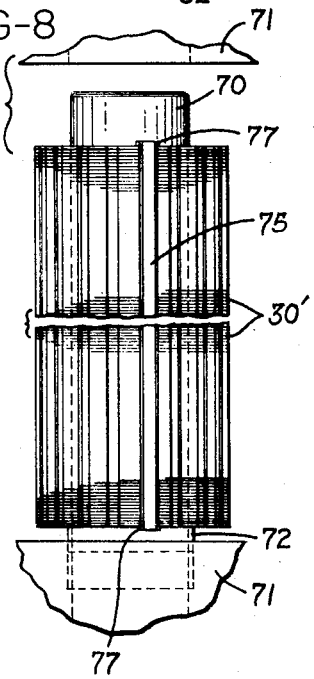
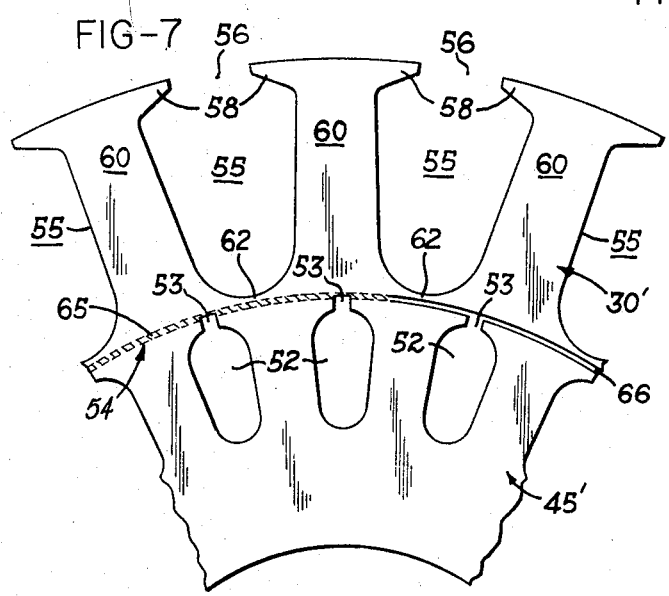
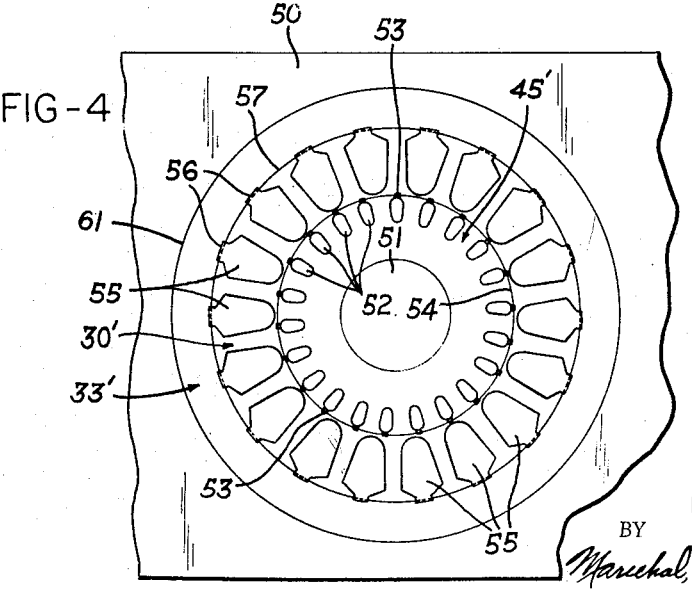
INVENTOR.
KENNETH R. LUNG
BY
ATTORNEYS

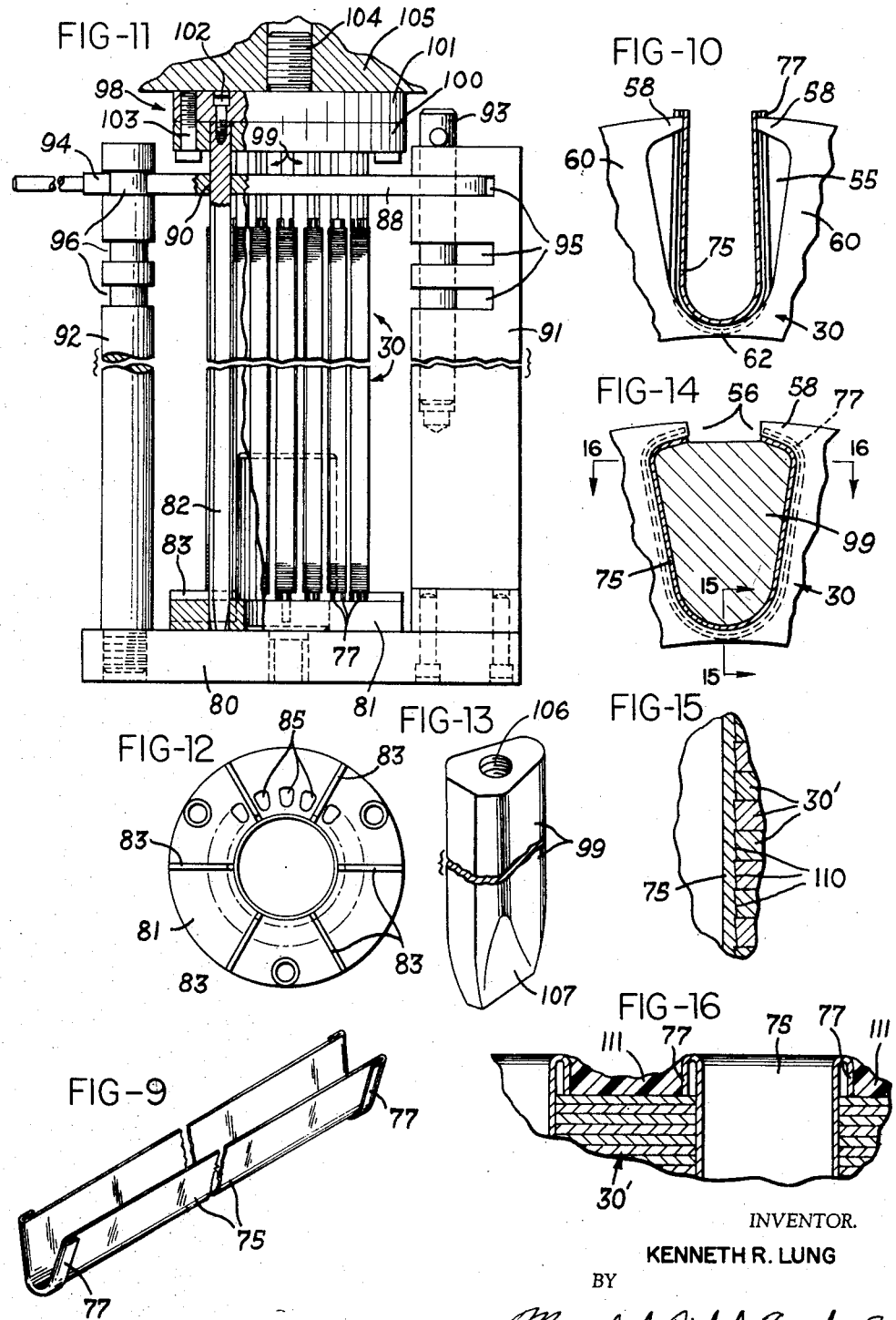

United States Patent Office 2,919,357
Patented Dec. 29, 1959

2,919,357

ELECTRIC MOTOR CONSTRUCTION

Kenneth R. Lung, Dayton, Ohio, assignor to The Tait Manufacturing Company, Dayton, Ohio, a corporation of Ohio Application July 18, 1957, Serial No. 672,654

13 Claims. (Cl. 310—42)

This invention relates to electrically operated pumps, and more specifically to dynamoelectric machines such as electric motors having particular adaptability for incorporation in pumps of the submersible type.

This application is a continuation-in-part of my now abandoned application Serial No. 545,987, filed November 9, 1957.

The invention has special relation to the manufacture of electric motors of relatively small diameter in comparison with the axial dimensions thereof, such motors offering difficulties in production which are less significant in the case of motors of larger sizes. In addition, it is of major importance that such small diameter motors be constructed to possess maximum operating efficiency, and also the production cost of such motors is an important factor in terms of both labor and materials. The present invention is concerned with all these aspects of motor manufacture.

It is a primary object of the invention to provide a method of manufacturing dynamoelectric machines which offers important advantages over prior practices from the standpoint of economy of both labor and materials, and which also results in the production of electric motors having outstandingly superior properties from the standpoint of operating efficiency.

An additional object is to provide a manufacturing method as outlined above whereby all the various metallic parts for the laminated rotor and stator structure for a dynamoelectric machine may be concentrically stamped from a single sheet of metal, and also whereby these several parts are assembled and secured in proper relation by simple manufacturing steps resulting in a motor of high efficiency.

Another object of the invention is to provide a manufacturing method as outlined above wherein the stator laminations which carry the field windings are secured together only by means of insulator strips and varnish before the windings are applied thereto, and it is also an object of the invention to provide such a method wherein an additional varnish-impregnating step is applied to the wound stator and serves at the same time to secure the spider and yoke portions of the stator permanently together.

Still another object is to provide a manufacturing method as outlined above wherein the rotor and stator laminations are blanked concentrically from the same sheet stock along a common circular periphery, wherein these laminations are separately stacked to receive windings, and wherein the stator stack is ground internally after assembly to such extent that an air gap of substantial radial dimensions is established for the rotor and that the metallic necks at the inner ends of the winding slots in the stator are reduced in radial dimensions to the minimum consistent with maintenance of a continuous layer of metal around the inner periphery of the stator.

Further objects of the invention are to provide dynamoelectric machines of superior characteristics and efficiency produced by means of the methods as outlined above, and particularly to provide an electric motor which incorporates a laminated stator wherein the individual laminations forming the spider portion of the stator are secured together solely by the insulators in the winding slots thereof in combination with varnish applied thereto in advance of the windings.

Additional objects and advantages of the invention will be apparent from the following description, the accompanying drawings and the appended claims.

In the drawings—

Fig. 1 is an elevational view illustrating a submersible pump assembly incorporating an electric motor constructed in accordance with the invention;

Fig. 2 is an enlarged and fragmentary view in axial section through the motor of the pump assembly of Fig. 1;

Fig. 3 is an enlarged radial section on the line 3—3 of Fig. 2;

Fig. 4 is a somewhat diagrammatic view illustrating successive steps in the fabrication of the rotor and stator laminations for the motor of Figs. 2 and 3;

Figs. 5 and 6 are enlarged fragmentary views showing single rotor and stator laminations, respectively, fabricated as illustrated in Fig. 4;

Fig. 7 is a further enlarged and fragmentary view illustrating additional details in the fabrication of the rotor and stator for the motor of Figs. 2 and 3;

Fig. 8 is a somewhat diagrammatic view generally in side elevation illustrating a step in the assembly of the stator of Figs. 2 and 3;

Fig. 9 is a fragmentary perspective view showing one of the insulators used in the slots for the field windings of the stator of Figs 2 and 4;

Fig. 10 is an enlarged fragmentary view in radial section through the stack of Fig. 8 illustrating an intermediate step in the assembly of the insulators in the slots of the stator of Figs. 2 and 3;

Fig. 11 is a view partly in side elevation and partly broken away in vertical section showing apparatus used to expand the insulators in the slots;

Fig. 12 is a detail plan view of a part of the apparatus of Fig. 11;

Fig. 13 is a fragmentary perspective view of another part of the apparatus of Fig. 11;

Fig. 14 is a view similar to Fig. 10 illustrating the step of expanding the insulators by the apparatus of Figs. 11–13.

Fig. 15 is a greatly enlarged fragmentary section on the line 15—15 of Fig. 14 with the expanding member removed; and Fig. 16 is a section taken as indicated by the line 16—16 of Fig. 14 showing the stator stack following impregnation.

Referring to the drawings, which illustrate preferred embodiments of the present invention, the electric motor shown in Figs. 2 and 3 is especially designed for incorporation in a submersible pump assembly of the general characteristics shown in Fig. 1, which includes a motor 20 having leads 21, a pump shell 22, and an intake cap 23 connecting the parts 20 and 22 and covered by a screen 24. The motor 20 is indicated in Fig. 2 as of the oil-filled type, and its lower end is provided with a flexible seal between its interior and the outside atmosphere, comprising a diaphragm 25 of rubber material housed in an end cap 26 having an opening 27 therethrough for direct access by the outside atmosphere to one side of the diaphragm 25. Details of the structure of these parts of the pump assembly are disclosed in my copending applications Serial No. 633,412, filed January 29, 1957, and Serial Nos. 646,667 and 646,693, filed March 18, 1957, all of which are assigned to the same assignee as this application.

The motor 20 includes a two-piece stator of laminated construction, comprising an inner section or spider 30, which carries the windings 31, and a cylindrical outer section or yoke 33, which is in turn provided with an outer cylindrical shell 35 of sheet metal. An end ring 36 is welded to each end of the shell 35, with the outer diameters of these end rings matching that of the shell 35 but their inner diameters being substantially less to provide adequate section to receive the mounting bolts 37 by which the end brackets 39 and 40 are secured on the opposite ends of the motor assembly.

The junction between each of the end rings 36 and its associated bracket 39 or 40 is readily sealed by means of an O-ring 41 as shown, and the brackets 39 and 40 each include a bearing portion 42, 43 for mounting the motor shaft 44 which carries the rotor 45, the latter being shown as also of laminated structure incorporating windings 46. Bushings 47 and thrust washers 48 complete the mountings of the shaft 44 in the brackets 39 and 40.

The restrictions on the size of a motor for use in a submersible pump assembly as outlined above are commonly quite severe, by reason of the limitations imposed by the diameter of the well pipe in which such pump assemblies are used. For example, it is a common practice to employ pipe having an inner diameter of 4 inches as the casing of a well in which a submersible pump assembly is to be used, which in turn requires that the maximum diameter for the pump assembly must be sufficiently less than 4 inches to permit easy installation of the assembly in such casing. This in turn necessarily limits the radial dimensions of the several components of the motor, and if the motor is to have adequate capacity for proper operation, these restrictions on its radial dimensions must be compensated for by extension of its axial dimensions. For example, the maximum diameter of the stator is as a practical matter limited to approximately 3.50 inches, and its inner diameter will then be less then 2 inches, whereas its axial length even for so low a rating as ½ horsepower is 4 inches, and this dimension may increase to as much as 15 inches for a rating of 5 horsepower. It is therefore highly important that such motors be constructed to have the maximum efficiency, and also that their assembly be as simple and economical as possible.

In the preferred embodiment of the invention, the stator spider 30, the yoke 33 and the rotor 45 are composed of sets of laminations which are all stamped from the same sheet metal blank 50 as indicated in Figs. 4-7. The first step in the production of these parts is illustrated in Fig. 4 and comprises punching the central hole 51, which will receive the motor shaft 44, and the series of slots 52 which will receive the rotor windings 46. As shown more clearly in Fig. 7, these slots 52 are somewhat paddle-shaped, and each includes an outer extension 53 which projects beyond the circle 54 on which the individual rotor laminations 45' are ultimately separated from the blank 50. In the next step as also illustrated in Fig. 4, the slots 55 for receiving the stator windings 31 are punched in the blank, and these slots are shown as somewhat spade-shaped so that each includes an outer extension 56 which projects beyond the circle 57 on which the laminations 30' are separated from the blank.

Following these punching operations, the individual rotor laminations 45' are blanked out of the sheet 50, and each then has the general configuration shown fragmentarily in Fig. 5, with each slot 52 having a narrow entering passage through the portion of its extension 53 which is retained in the lamination. The spider laminations 30' are then similarly blanked from the sheet 50 along the circle 57 to provide each slot 55 with a relatively narrow entering passage 56 which is overhung on both sides by the tongue portions 58 on either side of the generally T-shaped teeth 60 separating the successive slots 55. The individual stator laminations 30' will then have the configuration shown fragmentarily in Fig. 6, and in the next step, the rings 33' are blanked out of the sheet 50 on a circle 61 providing the desired outer diameter for the spider assembly as described above.

A major feature of the present invention, which is directly related to the initial formation of the spider laminations 30', concerns the radial dimensions of the necks 62 connecting adjacent teeth 60 at the inner ends of the slots 55. In the completed motor, if the radial dimension of these necks is too great, the efficiency of the motor will be reduced due to the development of belt leakage reactance, which causes the magnetic flux to tend to circulate around the stator rather than crossing the air gap to the rotor. On the other hand, if these necks are entirely removed from the finished stator, the efficiency of the motor will be undesirably affected by the resulting tooth pulsation losses. A third alternative, to provide these necks with a radial dimension small enough to avoid both of the other difficulties, would result in laminations of insufficient mechanical strength to withstand distortion and possible breakage during the initial stages of the assembly and winding of the stator by conventional techniques.

In accordance with the invention, the above difficulties are obviated and maximum efficiency in the motor is achieved by initially proportioning the laminations 30' to provide necks 62 having radial dimensions of sufficient magnitude for adequate strength during the initial stages of assembly of the stator, and this dimension is subsequently reduced by a machining, such as boring, operation on the assembled stack of spider laminations which will also provide the proper air gap between the stator and rotor in the completed motor. This relationship of the parts is illustrated somewhat diagrammatically in Fig. 7, which shows the necks 62 as initially extending radially from the outer periphery 54 of the rotor laminations 45' to the inner ends of the slots 55. For example, satisfactory results have been obtained in the practice of the invention with this dimension initially of the order of 0.022 inch when the sheet stock from which the laminations are formed is 0.025 inch in thickness. During the subsequent grinding operation, after the spider stack has been assembled as described hereinafter, the inner diameter of the stack is increased by a sufficient amount to reduce the radial dimension of the necks 62 to as little as 0.007–0.010 inch, as by removing as much as 0.015 inch on a radius. The stock removed during this operation is indicated by the shaded area 65 in Fig. 7 and provides the air gap 66 in the completed motor, and this grinding step will also eliminate the slot portions 53 from the inner surface of the stack.

Referring now to Fig. 8, the individual spider laminations 30' are stacked on an arbor 70 in axially aligned relation and subjected to sufficient axial pressure to bring them all into close face to face relation. Fig. 8 indicates a portion of a die 71 for carrying out this step in a press, and this step also causes any burrs resulting from the punching and blanking operations to be pushed together to provide an effectively smooth stack. The die 71 is then raised, and the stack is preferably retained on the arbor 70 but in raised position providing access to both ends thereof, as by means of the spring-raised sleeve 72 in Fig. 8, and with the stack in such position, insulators 75 are inserted in at least some of the aligned slots 55.

Fig. 9 illustrates in detail an insulator 75 of U-shaped heavy paper construction which has proved satisfactory for the purposes of the invention, and which is provided with overturned cuffs 77 at both ends thereof. The outer peripheral dimension of each of these insulators should be approximately equal to the corresponding inner dimension of the slots 55 so that when the insulators are initially inserted radially in the slots 55, they will project slightly therebeyond radially as indicated in Fig. 10, and also they will overhang both ends of the stack to the extent of their cuffs 77, as indicated in Figs. 8 and 16. It has also been found that after a few insulators have been inserted while the stack is retained on the arbor 70, for example three insulators placed in slots approximately equidistant from each other, the stack may then be removed from the arbor to any other convenient location where insulators are similarly inserted in all of the remaining slots 55.

In the next step of the method, the insulators 75 are expanded circumferentially into firmly interlocking frictional engagement with the sides of their respective slots 55, and Figs. 11-14 illustrate apparatus for carrying out this step. This apparatus includes a base plate 80 on which is mounted a bottom guide plate 81 and a centering mandrel 82 for the stack 30. The guide plate 81 has a plurality of keys 83 mounted in slots in its upper surface to fit between the cuffs 77 on the bottom end of the stack 30, and the guide plate 81 also has therein a plurality of slots 85 which are thereby aligned with the slots 55 in the stack. A similar guide plate 88 having slots 90 therein matching the slots 85 is mounted on the base plate 80 by means of a pair of standards 91 and 92, and the guide plate 88 is pivoted on the standard 91 by a shaft 93 for swinging movement into and out of engagement of its latch portion 94 with standard 92. The height of the mounted position of the guide plate 88 may be changed in accordance with the axial length of the stack 30 as indicated by the slots 95 and 96 in standards 91 and 92.

The expanding operation on the insulators 75 is carried out simultaneously in all of the slots 55 by means of a fixture 98 comprising a plurality of fingers 99 equal in number of the slots 55 and longer than the maximum axial dimension of the stack 30. The fingers 99 are all secured at one end to a pair of plates 100 and 101 by means of screws 102 and 103, and the plate 101 is in turn mounted at 104 on a power device 105, such as the platen or plunger of a press, for reciprocating the fixture 98 lengthwise of fingers 99. The upper end of each finger 99 has a tapped hole 106 for a screw 102, and the lower or free end of each of the fingers 99 is beveled at 107 to provide a pilot portion for initial entry into the slots 55.

Each of the fingers 99 over substantially its entire length, except the pilot portion 107, is of essentially the same shape in cross section as the slots 55 and of very slightly smaller dimensions. Theoretically, the relative proportions of the fingers and the slots should be such that the clearance therebetween would be equal to the thickness of a single insulator, but in practice it appears that there are sufficient minor variations in slot size and angular misalignments of the laminations to require a slightly greater clearance. Thus preferred results in the practice of the invention have been obtained when the relative dimensions of the fingers 99 and slots 55 are such that the clearance therebetween is a few thousandths of an inch greater than the thickness of an insulator 75, for example .005 inch for a stator 4 inches long, and this clearance requirement is likely to increase slightly with increased length of the stack.

The result of this expanding operation carried out by the apparatus of Figs. 11-13 is shown in Figs. 14-15. In the first place, as is illustrated in the greatly enlarged showing in Fig. 15, the inner surface of each of the slots 55 is not accurately parallel with the axis of the stack but instead is at an angle thereto which is the inherent result of the punching operation on the original blank 50, with this angle being of the order of 2° to 3°. Therefore, the inner surface of each slot 55 has a configuration which is definitely saw-toothed in section, as is represented in Fig. 15 by the inner surface portion 110 on each of the laminations 30'. As a result, when the expanding operation is carried out with the parts of the relative proportions described, each insulator 75 is forced into an actual interlocking relationship with its adjacent toothed wall surface. When this step is completed, the stack 30 is sufficiently firmly held together by the radially interlocking action of the insulators in the respective slots 55, combined also with the overlapping of the cuffs 77 at both ends of the stack, that the stack can be treated as a self-supporting unit.

In accordance with the invention, the next step is to impregnate the stack with a suitable insulating varnish, such for example as epoxy resin, and such varnish is then properly cured. It is an important feature of the invention that this impregnation step be carried out before any windings are applied to the stator, and it is also desirable that the impregnation be carried out under vacuum to assure maximum impregnating action. In fact, it is likely that there will be spaces at scattered locations between the outer surface of an insulator and the adjacent slot wall, due both to the saw-toothed configuration of the wall and also to irregularities in slot size and alignment noted above, and vacuum impregnation will tend to fill such spaces with varnish.

It has been found that when the stack is assembled and impregnated as just described, the result is to bond the entire stack so firmly together that no other means for retaining the laminations in the stack is necessary. In particular, the resulting completed motor has been found to be as much as 10% more efficient than an otherwise similar motor in which the stator laminations are secured together by means such as welding or riveting which also produces electrical connections therebetween. Maximum benefit from this step of the method of the invention is obtained when the insulators 75 are formed of highly absorbent paper to cause maximum absorption of the impregnating varnish in the paper itself. In addition, the varnish which hardens in impregnating relation with the insulator cuffs 77, and also between adjacent cuffs as indicated at 111 in Fig. 16, aids the desired result by establishing effective locking actions at both ends of the stack. Similar aid is provided by the varnish which fills such interstices as exist between the insulators and the stack wall prior to impregnation as discussed above.

Following the impregnation and curing steps just described, the stack 30 is ready for its final fabricating steps. Its inner periphery should be cleaned, as by a wire brush, sufficiently for again mounting on a suitably supporting arbor, and its outer periphery is then ground sufficiently to provide for slip fit assembly thereof within the laminated cylindrical stack 33. Satisfactory results from this standpoint have been achieved in a motor of the dimensions listed above if the outer diameter of the stack 30 is reduced by an amount in the range of 0.003-0.006 inch. The outer periphery of the stack 30 may then be mounted in a suitable clamp in order to carry out the grinding operation on its inner periphery which has already been described in connection with Fig. 7. This grinding operation is followed by inserting the windings 31 in the stack in the desired manner. The usual slot wedges 115 (Fig. 3) may also be placed over the windings 31 in the slots 55.

This completes fabrication and winding of the stack 30, and it is ready for assembly in the laminated cylindrical stack 33 formed from the ring laminations 33'. These laminations are first assembled and secured together by any desired technique such as welding, particularly for stators of relatively short length, or riveting. Preferred results in accordance with the present invention have been obtained by wrapping the assembled stack tightly in a steel sheet and then welding the edges of this sheet together to form the shell 35 as shown in Fig. 2, and the end rings 36 may then be welded to the opposite ends of shell 35 and their outer surfaces machined to the desired concentric relation with the shell.

In the final steps of assembly of the stator, the wound stack 30 is assembled within the ring stack 33, and these two parts of the stator are jointly impregnated with a suitable varnish and cured. This technique, which preferably employs the same varnish as in the previous impregnating step, has been found to secure the inner and outer sections 30 and 33 of the stator together with adequate strength while also providing desired insulation protection for the windings on all portions of the stator. Following a final cleaning operation on its inner periphery, the stator is ready for assembly with the rotor 45, which may be constructed by any conventional technique, and preferably utilizing the laminations 45′ as already described.

The method of the invention accordingly offers outstanding advantages of simplicity and economy, and also it has the important result of providing motors of notably high operating efficiency. Thus the use of the expanded insulators and impregnating varnish as the sole means for retaining the spider laminations in stacked relation prior to application of the windings thereto eliminates the possibility of electrical connection by the adjacent laminations such as results when welding or similar metallic attaching means are used. Furthermore, the method of the invention, including particularly the feature of grinding out all except the minimum amount of metal in the necks 62, reduces to a corresponding minimum the leakage reactance without undesirably affecting the mechanical strength of the stator. In other words, the spider laminations are formed initially of adequate mechanical strength for the necessary handling during initial assembly, and while the finished dimensions of each lamination are such that it would have been mechanically too weak to handle during formation of the stack, this has no undesirable effect after the insulators are in place and the stack has been impregnated.

The method of the invention accordingly has the two fold result of providing proper mechanical strength irrespective of electrical properties when mechanical strength is important and of subsequently providing optimum electrical properties after the factor of mechanical strength has been taken care of by the intermediate manufacturing steps. The end result of the invention is therefore a dynamoelectric machine possessing higher efficiency than could otherwise have been obtainable, accompanied by the important practical advantages of economy and simplicity of production.

While the method and article herein described constitute preferred embodiments of the invention, it is to be understood that the invention is not limited to this precise method and article, and that changes may be made therein without departing from the scope of the invention which is defined in the appended claims.

What is claimed is:

1. In a method of fabricating a laminated stator for a dynamoelectric machine, the successive steps of blanking stator laminations having slots in the outer periphery thereof and connecting necks at the inner ends of said slots, assembling a plurality of said laminations in a stack with said slots in axial alignment, inserting in each of said aligned slots a generally U-shaped insulator of sheet material, expanding each said insulator within its associated slot to establish a frictional gripping relation between said insulators and the walls of said slots, impregnating said stack with a varnish and curing said varnish in bonding relation with said insulators and said laminations, thereafter machining the interior of said stack until the radial dimension of said necks is reduced to the minimum consistent with maintenance of a continuous layer of metal around the inner periphery of said stack, and then placing windings in the insulated slots.

2. A method of fabricating a laminated stator for a dynamoelectric machine, comprising the successive steps of blanking stator laminations having slots in the outer periphery thereof and connecting necks at the inner ends of said slots, assembling a plurality of said laminations in a stack with said slots in axial alignment, inserting in each of said aligned slots a generally U-shaped insulator of sheet material, simultaneously expanding each said insulator within its associated slot to establish a frictional gripping relation between said insulators and the walls of said slots, impregnating said stack with a varnish and curing said varnish in bonding relation with said insulators and said laminations, forming a stack of ring laminations having an inner diameter substantially equal to the outer diameter of said stator laminations, securing said ring laminations together to form a cylinder, grinding the outer periphery of said stator stack to a diameter providing for slip fit insertion thereof in said cylinder, thereafter placing electrical windings in said insulated slots, assembling said wound stack within said cylinder, and impregnating said assembled stacks with varnish and curing said varnish to secure said assembled stacks together.

3. In a method of fabricating a dynamoelectric machine, the successive steps comprising blanking concentric rotor and stator laminations from the same sheet stock along a common circular periphery with said stator laminations having slots in the outer periphery thereof and connecting necks at the inner ends of said slots, fabricating a rotor from said rotor laminations, assembling a plurality of said stator laminations in a stack with said slots in axial alignment, inserting in each of said aligned slots a generally U-shaped insulator of sheet material, simultaneously expanding each said insulator within its associated slot to establish a frictional gripping relation between said insulators and the walls of said slots, impregnating said stack with a varnish and curing said varnish in bonding relation with said insulators and said laminations, boring out the interior of said stack until the radial dimension of said necks is reduced to a predetermined very small value providing an air gap of substantial radial dimensions between said stack and said rotor, forming a stack of ring laminations having an inner diameter substantially equal to the outer diameter of said stator laminations, securing said ring laminations together to form a cylinder, grinding the outer periphery of said stator stack to a diameter providing for slip fit insertion thereof in said cylinder, thereafter placing electrical windings in said insulated slots, assembling said wound stack within said cylinder, impregnating said assembled stacks with varnish and curing said varnish to secure said assembled stacks together, and finally assembling said rotor within said assembled stacks.

4. A stator for a dynamoelectric machine comprising a stack of laminations having axially extending slots in the outer surface thereof, a generally U-shaped insulator received in each of said slots and having the outer surface thereof in firm frictional engagement with the adjacent wall of said slot, said stack and said insulators being impregnated with varnish covering substantially the entire inner surface of said insulators and the adjacent surfaced portions of said stack to secure said laminations and insulators in assembled relation independently of other parts of said stator, windings in said slots, a laminated cylindrical stack assembled in telescoping relation over said wound stack and having an inner diameter providing for slip fit assembly with said stack, and said assembled stacks being impregnated with varnish substantially filling the interstices therebetween and securing said stacks in said assembled relation.

5. A stator for a dynamoelectric machine comprising a stack of laminations having axially extending slots in the outer surface thereof, a generally U-shaped insulator received in each of said slots and having the outer surface thereof in firm frictional engagement with the adjacent wall of said slot, said stack and said insulators being impregnated with varnish covering substantially the entire inner surface of said insulators and the adjacent surface portions of said stack to secure said laminations and insulators in assembled relation independently of other parts of said stator, windings in said slots, each of said slots having a neck portion extending across the inner end thereof in connecting relation with the adjacent portions of said stack, said neck portions being of substantially the minimum radial dimension consistent with maintenance of continuity of metal around the entire inner inner periphery of said stack, and a cylindrical yoke secured in telescoping relation over said wound stack.

6. A stator structure as defined in claim 5 wherein the maximum radial dimension of said necks is not greater then 0.010 inch.

7. In a dynamoelectric machine, the combination of a stator comprising a stack of laminations having axially extending slots in the outer surface thereof, a generally U-shaped insulator received in each of said slots and having the outer surface thereof in firm frictional engagement with the adjacent wall of said slot, said stack and said insulators being impregnated with varnish covering substantially the entire inner surface of said insulators and the adjacent surface portions of said stack to secure said laminations and insulators in assembled relation independently of other parts of said stator, windings in said slots, each of said slots having a neck portion extending across the inner end thereof in connecting relation with the adjacent portions of said stack, a rotor received within said stator, and means establishing an annular air gap between said rotor and said stator having a radial dimension greater than the maximum radial dimension of said neck portions.

8. A stator for a dynamoelectric machine comprising a stack of individual laminations each having slots in the outer periphery thereof, said laminations being assembled in said stack with said slots in axial alignment, each of said slots having an inner wall which is inclined with respect to the surfaces of said laminations to provide saw-toothed wall surface in said aligned slots, a generally U-shaped insulator received in each of said slots, each of said insulators having the outer surfaces thereof expanded into interlocking relationship with said saw-toothed surface of the associated said slots, said stack and said insulators being impregnated with varnish covering substantially the entire inner surface of said insulators and the adjacent surface portions of said stack to secure said laminations and insulators in assembled relation independently of other parts of said stator, and windings in said slots.

9. A stator for a dynamoelectric machine comprising a stack of individual laminations each having slots in the outer periphery thereof, said laminations being assembled in said stack with said slots in axial alignment, each of said slots having an inner wall which is inclined with respect to the surfaces of said laminations to provide saw-toothed wall surfaces in said aligned slots, a generally U-shaped insulator received in each of said slots and extending beyond said stack at both ends thereof, each said insulator having an overturned cuff portion at each end thereof substantially abutting the adjacent outermost said lamination, each of said insulators having the outer surfaces thereof expanded into interlocking relationship with said saw-toothed surface of the associated said slots, said stack and said insulators being impregnated with varnish covering substantially the entire inner surface of said insulators as well as said cuff portions and the adjacent surface portions of said stack to secure said laminations and insulators in assembled relation independently of other parts of said stator, and windings in said slots.

10. The method of fabricating a core unit for a dynamoelectric machine, comprising the successive steps of blanking a plurality of laminations having spaced generally radially extending slots and connecting necks at the radially inner ends of said slots of sufficient thickness to maintain the configuration of the individual laminations during handling, assembling said laminations in a stack with said slots axially aligned, inserting a generally U-shaped insulator of sheet material into each of said grooves extending the full length thereof, simultaneously pressing each of said insulators into interlocking engagement with the walls of an associated said slot to hold said laminations in assembly for further operations, impregnating the assembled said stack and insulators with a varnish and curing said varnish to bond the assembled laminations and insulators into a self-sustaining core unit, and machining the interior surface of said core unit to reduce the thickness of said necks to a predetermined minimum dimension.

11. A core unit for a dynamoelectric machine comprising a stack of laminations each having spaced generally radially extending slots defined by spaced teeth portions connected through necks at the radially inner ends of said slots, said necks being of such reduced thickness as to be incapable of independently maintaining said teeth portions in proper aligned relation, a plurality of generally U-shaped insulators of sheet material extending through said slots axially of said core maintaining said slots in axial alignment, each said insulator extending beyond said stack at both ends thereof and including at each end a peripheral cuff portion substantially abutting the adjacent outermost lamination, and a cured bonding and insulating material impregnated into the stacked laminations and supporting insulators maintaining the complete stack and insulators in self-sustaining relation independent of integral connections therebetween.

12. A stator for a dynamoelectric machine comprising a stack of laminations each having spaced generally radially extending slots defined by spaced teeth portions connected by necks at the radially inner ends of said slots, said necks being of such reduced thickness as to be incapable of independently maintaining said teeth portions in proper aligned relation, a plurality of generally U-shaped insulators of sheet material extending through said slots axially of said core maintaining said slots in axial alignment, each said insulator extending beyond said stack at both ends thereof and including at each end a peripheral cuff portion substantially abutting the adjacent outermost lamination, cured bonding and insulating material impregnated into the stacked laminations and supporting insulators maintaining the complete stack and insulators in self-sustaining relation independent of integral connections therebetween, and windings extending axially of said stator through each of said insulators.

13. A stator structure as defined in claim 12 including a cylindrical yoke of stacked laminations surrounding said stator and bonded thereto by further cured impregnating material.

References Cited in the file of this patent

UNITED STATES PATENTS

| | | |
|---|---|---|
| 491,708 | Jefferson | Feb. 14, 1893 |
| 1,661,355 | Baker | Mar. 6, 1928 |
| 1,974,406 | Apple | Sept. 25, 1934 |
| 2,018,405 | Langworthy | Oct. 22, 1935 |
| 2,354,551 | Sawyer | July 25, 1944 |
| 2,423,345 | Roters | July 1, 1947 |
| 2,423,869 | Blessing | July 15, 1947 |
| 2,565,530 | Smith | Aug. 28, 1951 |
| 2,653,208 | Ballman | Sept. 22, 1953 |
| 2,761,078 | McAdam | Aug. 28, 1956 |